US012745718B2

(12) United States Patent
Elliott

(10) Patent No.: US 12,745,718 B2
(45) Date of Patent: Sep. 29, 2026

(54) GROW CABINET

(76) Inventor: Melbourne Elliott, Hitchin (GB)

( * ) Notice: Subject to any disclaimer, the term of this patent is extended or adjusted under 35 U.S.C. 154(b) by 0 days.

(21) Appl. No.: 13/786,158

(22) PCT Filed: Sep. 8, 2011

(86) PCT No.: PCT/GB2011/051675
§ 371 (c)(1), (2), (4) Date: Mar. 5, 2013

(87) PCT Pub. No.: WO2012/032346
PCT Pub. Date: Mar. 15, 2012

(65) Prior Publication Data

US 2013/0180168 A1 Jul. 18, 2013

(30) Foreign Application Priority Data

Sep. 8, 2010 (GB) ..................................... 1014928

(51) Int. Cl.
*A01G 9/16* (2006.01)

(52) U.S. Cl.
CPC ................ *A01G 9/16* (2013.01); *Y02A 40/25* (2018.01)

(58) Field of Classification Search
CPC ... A01G 9/02; A01G 9/14; A01G 9/16; A01G 9/247; A01G 9/24; F25D 25/024; F25D 25/025; F25D 25/02
USPC ........................................ 47/60, 69, 17, 66.6
See application file for complete search history.

(56) References Cited

U.S. PATENT DOCUMENTS

| | | | | | |
|---|---|---|---|---|---|
| 542,341 | A | * | 7/1895 | Little | A47B 53/02 312/198 |
| 643,416 | A | * | 2/1900 | Kohout et al. | A45C 7/00 190/15 R |
| 1,281,923 | A | * | 10/1918 | Fales | A47B 88/42 312/317.2 |
| 4,175,513 | A | * | 11/1979 | Roehrick | 119/246 |
| 4,318,575 | A | * | 3/1982 | Redlich | A47B 88/944 297/143 |
| 4,543,744 | A | | 10/1985 | Royster | |
| 4,603,643 | A | | 8/1986 | Couvrette | |
| 4,669,790 | A | * | 6/1987 | Briggs | A47B 21/03 D6/671.1 |
| 4,861,122 | A | * | 8/1989 | Newhouse et al. | 312/330.1 |
| 5,152,099 | A | | 10/1992 | Nilssen | |

(Continued)

FOREIGN PATENT DOCUMENTS

| | | | | |
|---|---|---|---|---|
| AU | 2005201550 A1 | * | 10/2005 | A47B 71/00 |
| CN | 101743861 | | 6/2010 | |

(Continued)

OTHER PUBLICATIONS

Machine translation for EP 0392268.*

(Continued)

*Primary Examiner* — Son T Nguyen
(74) *Attorney, Agent, or Firm* — Sandra Poteat Thompson; Finlayson Toffer LLP

(57) ABSTRACT

A grow cabinet, for indoor use, comprising a first portion, defining a first cavity, and a second portion, defining a second cavity, wherein the first and second portion are configured to register, for communication of the first and second cavity and for complimentary slidable engagement, such that a floor area of the combined first and second cavity is variable.

13 Claims, 9 Drawing Sheets

(56) References Cited

U.S. PATENT DOCUMENTS

| | | | | |
|---|---|---|---|---|
| 5,315,834 | A * | 5/1994 | Garunts et al. | 62/78 |
| 6,595,606 | B1 * | 7/2003 | Gunst | G07F 19/20 109/24.1 |
| 7,469,849 | B1 * | 12/2008 | Lo | B02C 18/0007 241/100 |
| 7,794,105 | B2 * | 9/2010 | Mberti et al. | 362/218 |
| 2002/0073613 | A1 | 6/2002 | Wijbenga | |
| 2003/0025424 | A1 * | 2/2003 | Graves | A47B 88/41 312/198 |
| 2007/0028512 | A1 * | 2/2007 | McGhee | 47/17 |
| 2008/0216398 | A1 | 9/2008 | Townsley | |
| 2011/0192082 | A1 * | 8/2011 | Uchiyama | 47/66.6 |
| 2012/0042568 | A1 * | 2/2012 | Keith | 47/66.6 |
| 2018/0092805 | A1 * | 4/2018 | Perovic | A61H 33/066 |

FOREIGN PATENT DOCUMENTS

| | | | | |
|---|---|---|---|---|
| DE | 9408060 | | 9/1994 | |
| DE | 9408060 | U1 * | 9/1994 | B66F 19/00 |
| DE | 20015211 | | 3/2001 | |
| DE | 102005022934 | | 3/2006 | |
| EP | 0 392 268 | A1 | 10/1990 | |
| EP | 0392268 | | 10/1990 | |
| EP | 1054113 | | 11/2000 | |
| GB | 2214945 | | 9/1989 | |
| GB | 2427880 | | 1/2007 | |
| KR | 100793784 | B1 * | 1/2008 | |
| WO | 2006051221 | | 5/2006 | |

OTHER PUBLICATIONS

DE9408060 machine translation.*
International Search Report, dated Feb. 1, 2012.
Intellectual Property Office Search Report, dated Dec. 14, 2010.
International Search Report, Feb. 1, 2012.
Intellectual Property Office Search Report, Dec. 14, 2010.

* cited by examiner

GROW CABINET

This United States Utility Application is a National Stage Application that claims priority to PCT/GB2011/051675 filed on Sep. 8, 2011 and entitled "Grow Cabinet" and Great Britain Patent Application GB 1014928.4 filed on Sep. 8, 2010 and entitled "Grow Cabinet", both of which are commonly-owned and incorporated herein in their entirety by reference.

FIELD OF THE SUBJECT MATTER

The field of the subject matter relates to a grow cabinet for indoor use.

BACKGROUND

This invention relates to a grow cabinet for indoor use.

Grow cabinets, sometimes referred to as grow-rooms, grow-boxes or grow-tents, are used to recreate and control an environment for growing plants. Primarily, growcabinets are used by horticulturalists who have no access to an outdoor environment, e.g. a horticulturalist living in a flat with no garden, and wish to recreate an environment suitable for growing plants.

One of the benefits of a grow cabinet is that it can be used to control the environment for growing plants. For example, when growing exotic plants in a part of the world where the outdoor environment is unsuitable, the horticulturalist may recreate the exotic plant's native environment in the grow cabinet, by modifying, e.g. the temperature or irradiance.

There are problems associated with the grow cabinets of the prior art. Grow cabinets are generally in the form of a shell, i.e. an enclosed volume providing a distinct internal environment. Thus, once the internal environment has been set up for a plant at a particular stage of its life cycle, the grow cabinet is then not optimally set up for growing other plants or the same plant at a different part of the life cycle. Therefore, for example, if a horticulturalist is currently using his/her grow cabinet to grow a first plant in the later stages of its life cycle, and wishes to grow a second plant in the early stages of its life cycle, then he must either sacrifice optimum conditions for growing either the first or second plant, or must buy a second grow cabinet to recreate an optimal environment for growing the second plant.

It is therefore desirable to provide a grow cabinet that alleviates some or all of the above problems.

SUMMARY OF THE SUBJECT MATTER

Figure 1:
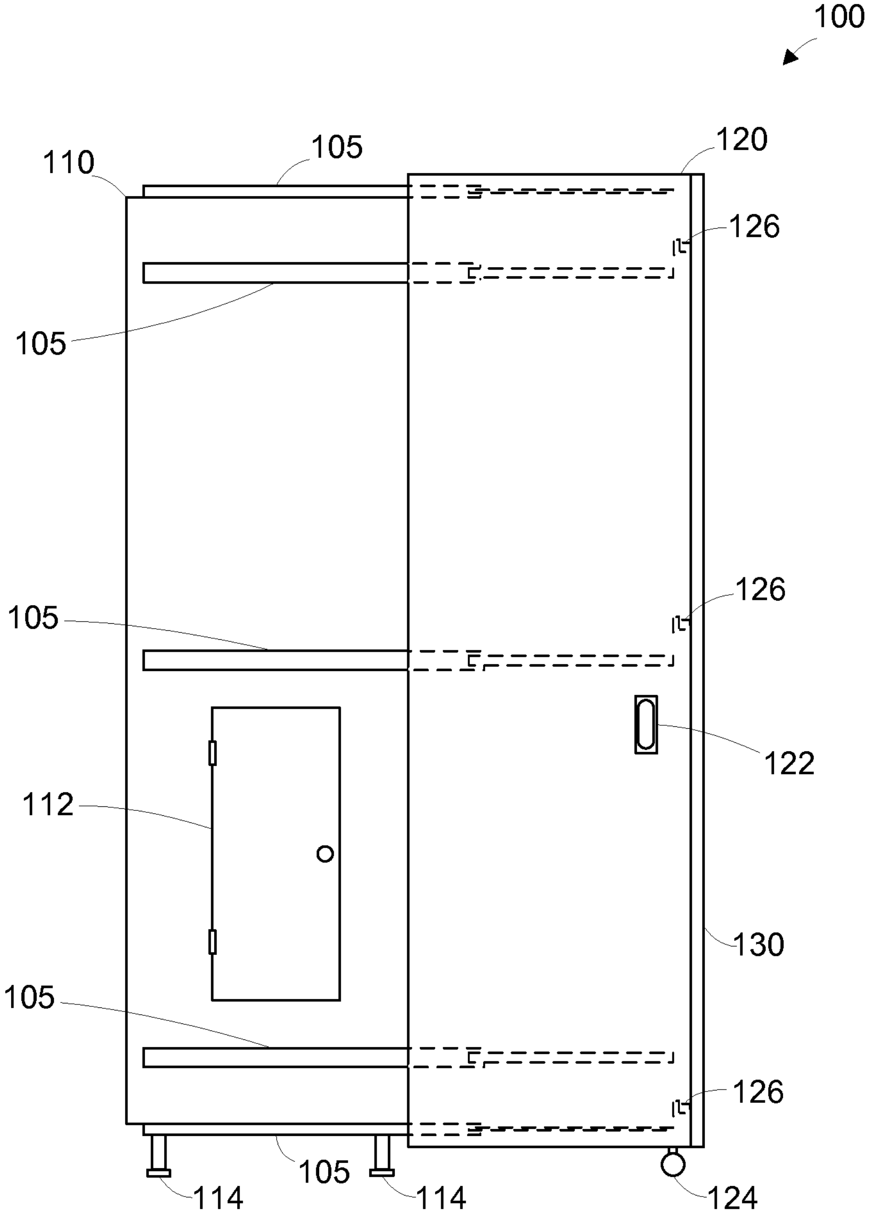
FIG. 1 is a side view of a first embodiment of a grow cabinet of the present invention.

A grow cabinet, for indoor use, is disclosed herein that comprises a first portion, defining a first cavity; and a second portion, defining a second cavity, wherein the first and second portion are configured to register, for communication of the first and second cavity and for complimentary slidable engagement, such that a floor area of the combined first and second cavity is variable.

DETAILED DESCRIPTION

According to a first aspect of the invention there is provided a grow cabinet, for indoor use, comprising a first portion, defining a first cavity, and a second portion, defining a second cavity, wherein the first and second portion are configured to register, for communication of the first and second cavity and for complimentary slidable engagement, such that a floor area of the combined first and second cavity is variable.

The present invention therefore provides an advantageous grow cabinet, as the volume of the internal environment, that is, the volume of the combined first and second cavity, can be varied by virtue of a variable floor area. Therefore, the horticulturalist may vary the internal environment, e.g. the irradiance, temperature and Carbon Dioxide levels, by sliding one portion with respect to the other, in order to change the volume of the combined cavity.

Thus, the combined first and second cavity, which has a width, depth and height, may be variable in width and depth such that a horizontal cross sectional area at any point along its height is variable. Thus, in one embodiment of a grow cabinet of the present invention (having only one combined first and second cavity) the floor area is variable.

In more complex grow cabinets (for example having multiple combined first and second cavities, each combined first and second cavity having a depth, width and height), the depth and width of any one of the combined first and second cavities may be variable such that a horizontal cross sectional area at any point along its height is variable.

The grow cabinet therefore has particular advantages over the grow cabinets of the prior art. For example, the horticulturalist may initially set up his grow cabinet to have a smaller volume/floor area (therefore having a greater irradiance), and place several plants in the optimized internal environment to grow up. As the plants mature and require more space, the horticulturalist may simply increase the size of the grow cabinet to accommodate his larger crop. In the prior art, the horticulturalist would either have to buy separate grow cabinets for each plant, or would keep all the plants in the same fixed sized grow cabinet, and sacrifice optimal growing area per plant. The grow cabinet of the present invention therefore produces plants with a greater yield.

Furthermore, if the horticulturalist wishes to introduce a different plant (or a same plant but at a different stage of its life cycle) to a grow cabinet already nurturing a plant, he/she may increase the volume/floor area of the grow cabinet and partition it to create two distinct internal environments. The horticulturalist may therefore set up two distinct internal environments, each optimized for a particular plant. The grow cabinet of the present invention therefore offers greater flexibility.

Preferably, the grow cabinet further comprises a runner, for complimentary slidable engagement of the first portion and second portion. Furthermore, the grow cabinet may comprise a seal, for sealing the combined cavity. The internal environment of the grow cabinet may therefore be sealed off from the external environment. Advantageously, therefore, the horticulturalist may have more control of the gaseous constituents of the internal environment, such that it may be set up for optimal conditions for a particular plant. Preferably, the seal is a brush seal.

A bottom face of the first portion may include an adjustable foot and a bottom face of the second portion may include a wheel. The adjustable foot allows the grow cabinet to be levelled on an uneven surface, which is advantageous when the horticulturalist is using a water tray in the grow cabinet. The wheel facilitates the sliding motion of the second portion with respect to the first portion.

Preferably, a bottom face of the second portion includes a slit, configured to register with the adjustable foot of the first portion. The slit may further include a seal, for sealing the combined cavity. Therefore, the second portion may slide over the adjustable foot of the first portion, and the internal environment may be sealed off. Preferably, the seal is a brush seal.

Optionally, the first and/or second portion includes an air vent, and/or a window. The air vent provides further control of the gaseous constituents of the internal environment. The window allows the horticulturalist to view the internal environment without disturbing it.

Preferably, an inner surface of the first portion and an inner surface of the second portion include a reflective coating. Thus, the irradiance of the grow cabinet is optimized.

Preferably, the first and second portions are constructed out of solid, opaque material. Furthermore, the grow cabinet may include a light source, for emulating light from the Sun.

The grow cabinet preferably includes a bi-folding door. The bi-folding door is advantageous as it allows the horticulturalist to open the grow cabinet by only opening one portion of the bi-folding door (which minimizes disturbances to the internal environment), and allows the horticulturalist to fully open the bi-folding door into a smaller external area.

Optionally, the grow cabinet further comprises a water reservoir. Therefore, the horticulturalist may store water with his grow cabinet for ergonomic use. The water reservoir may also hold particular nutrients for the plant.

Optionally, the grow cabinet may further comprise a propagator. Therefore, younger plants may be propagated near the grow cabinet and then be transported into the grow cabinet at maturity.

The water reservoir and/or the propagator may be provided on a rear face of the first portion.

Figure 2:
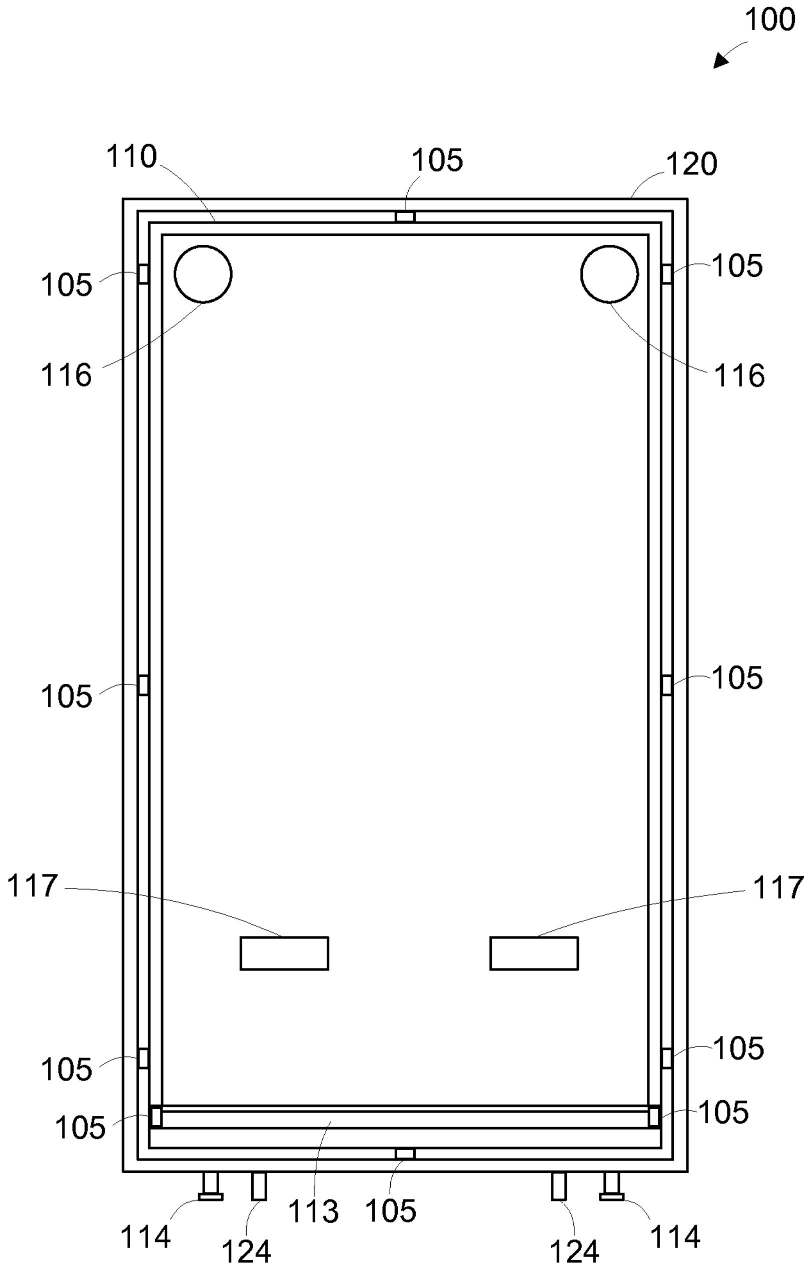
FIG. 2 is a rear view of the grow cabinet of FIG. 1.
Figure 3:
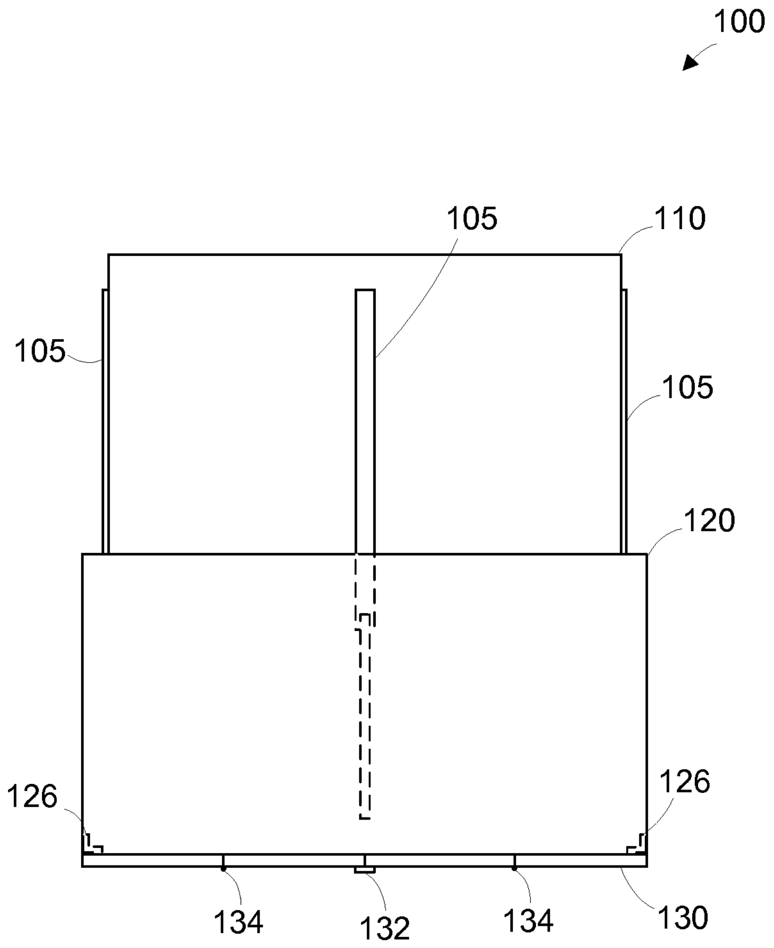
FIG. 3 is a top view of the grow cabinet of FIG. 1.
Figure 4:
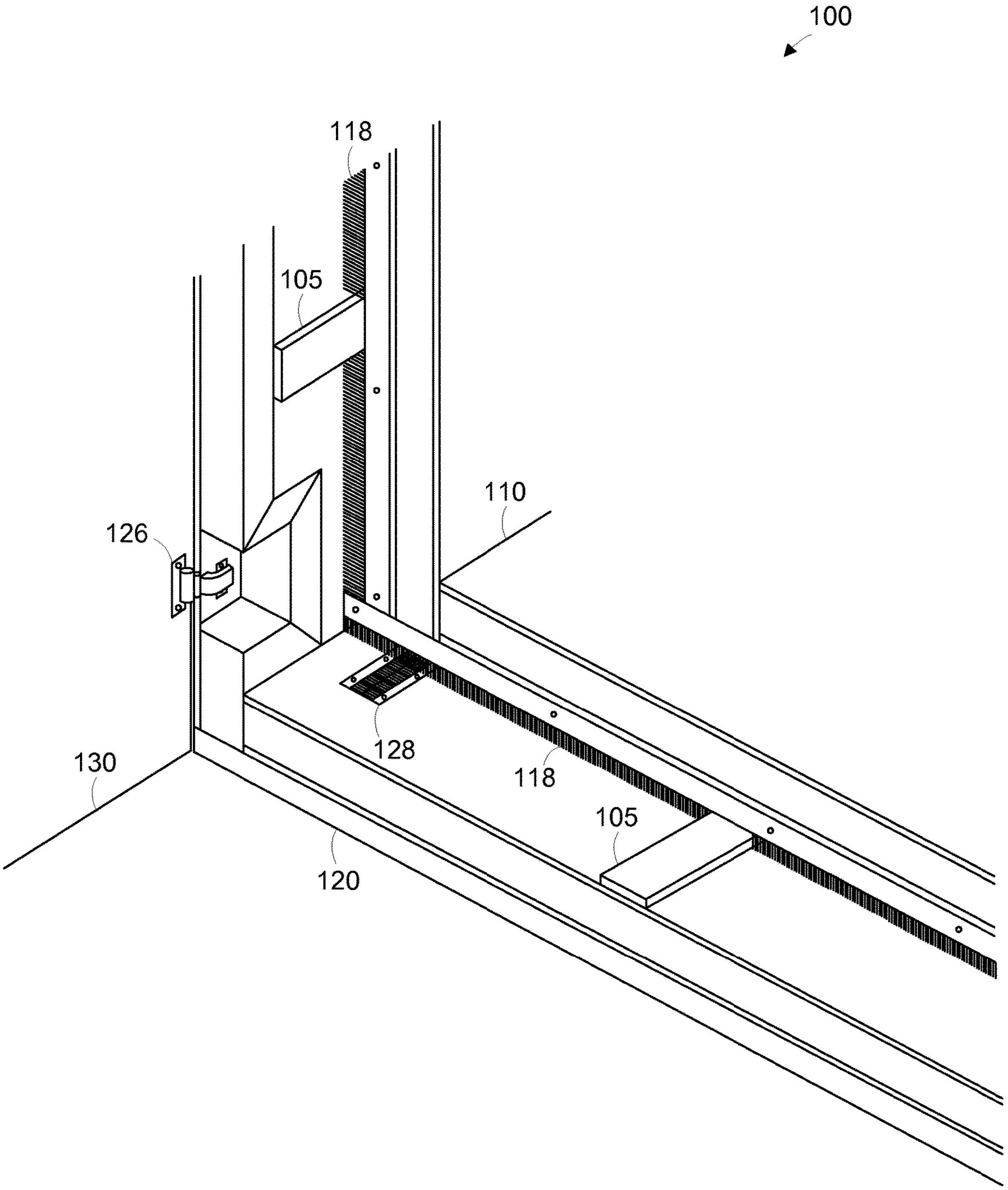
FIG. 4 is a perspective view of a corner of the grow cabinet of FIG. 1.
Figure 5:
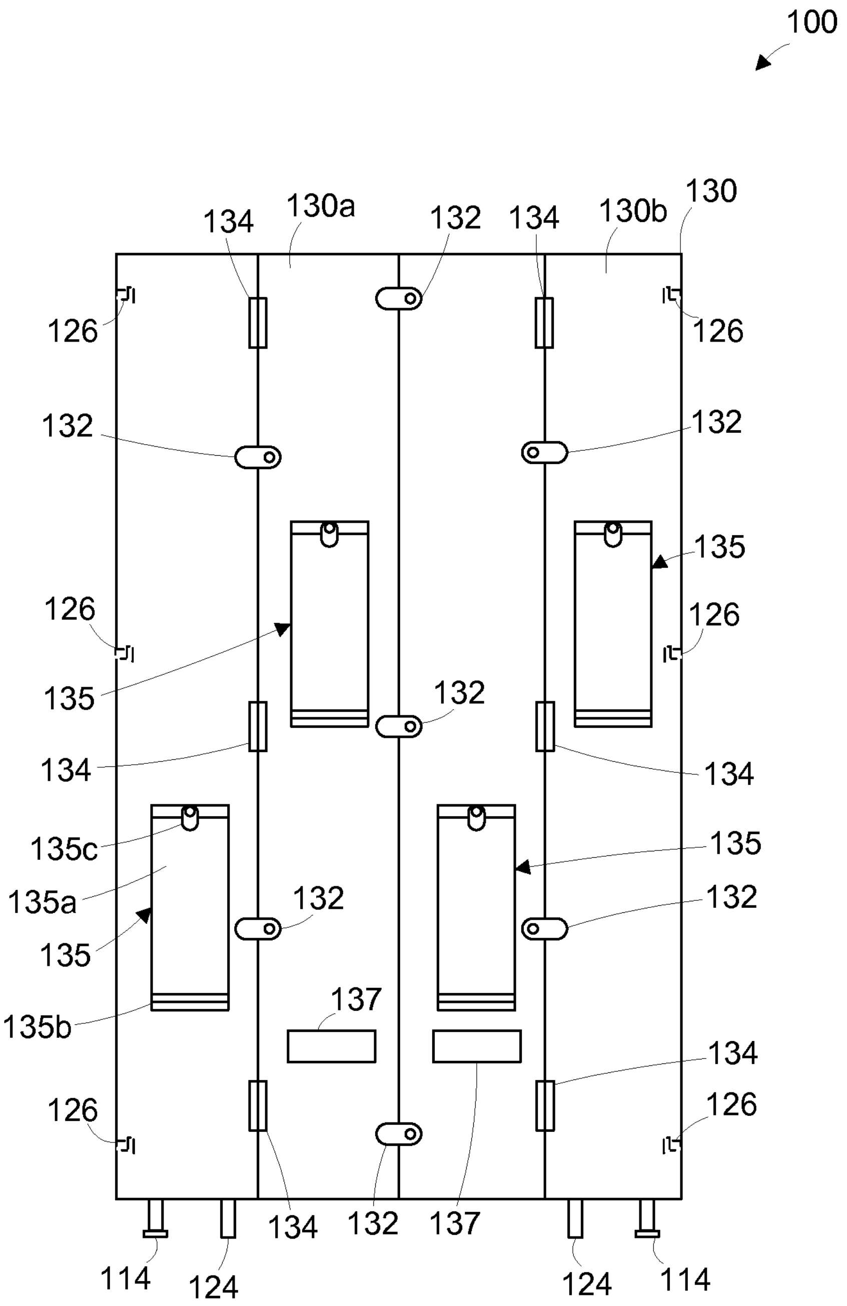
FIG. 5 is a front view of the grow cabinet of FIG. 1.
Figure 6:
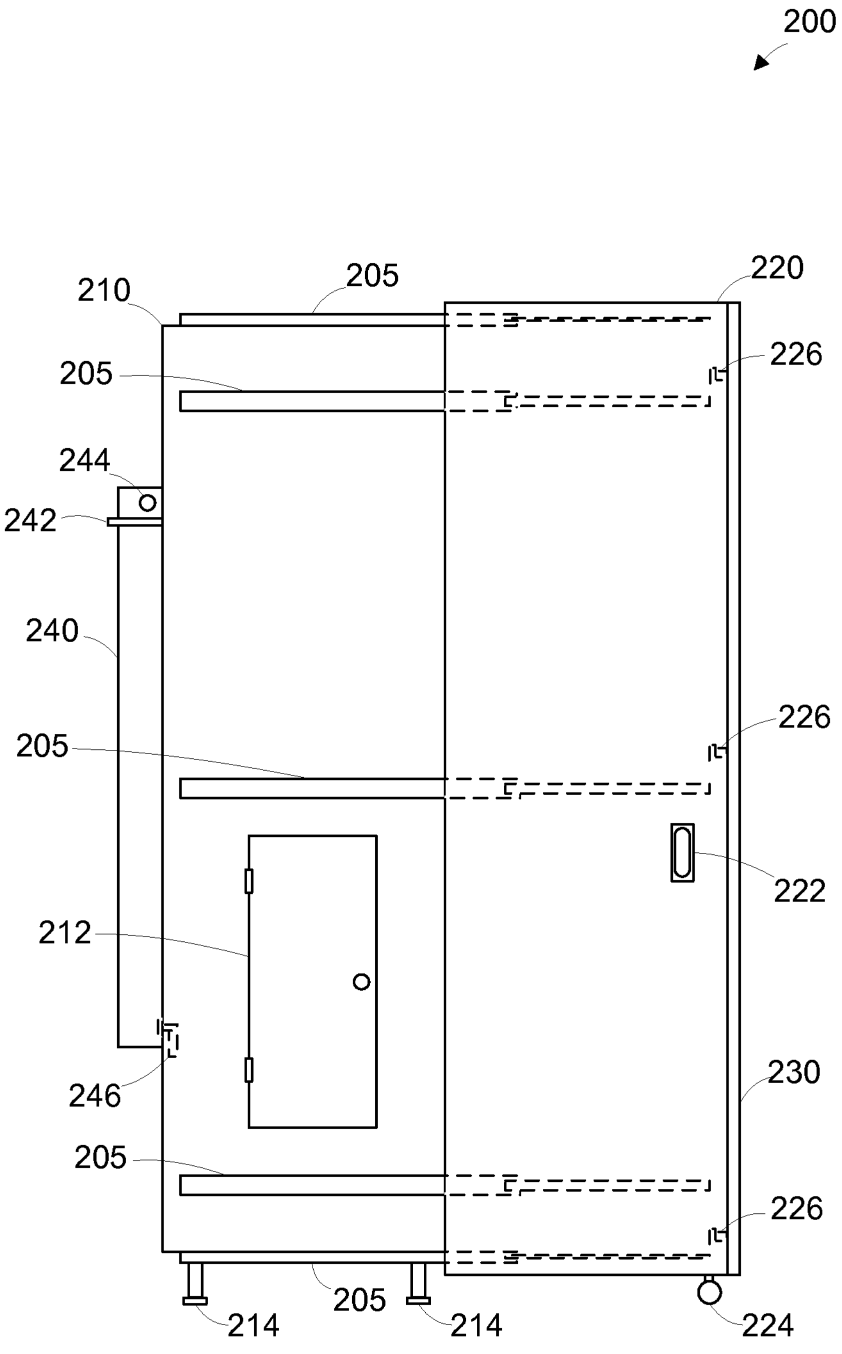
FIG. 6 is a side view of a second embodiment of a grow cabinet of the present invention, showing a water reservoir.
Figure 7:
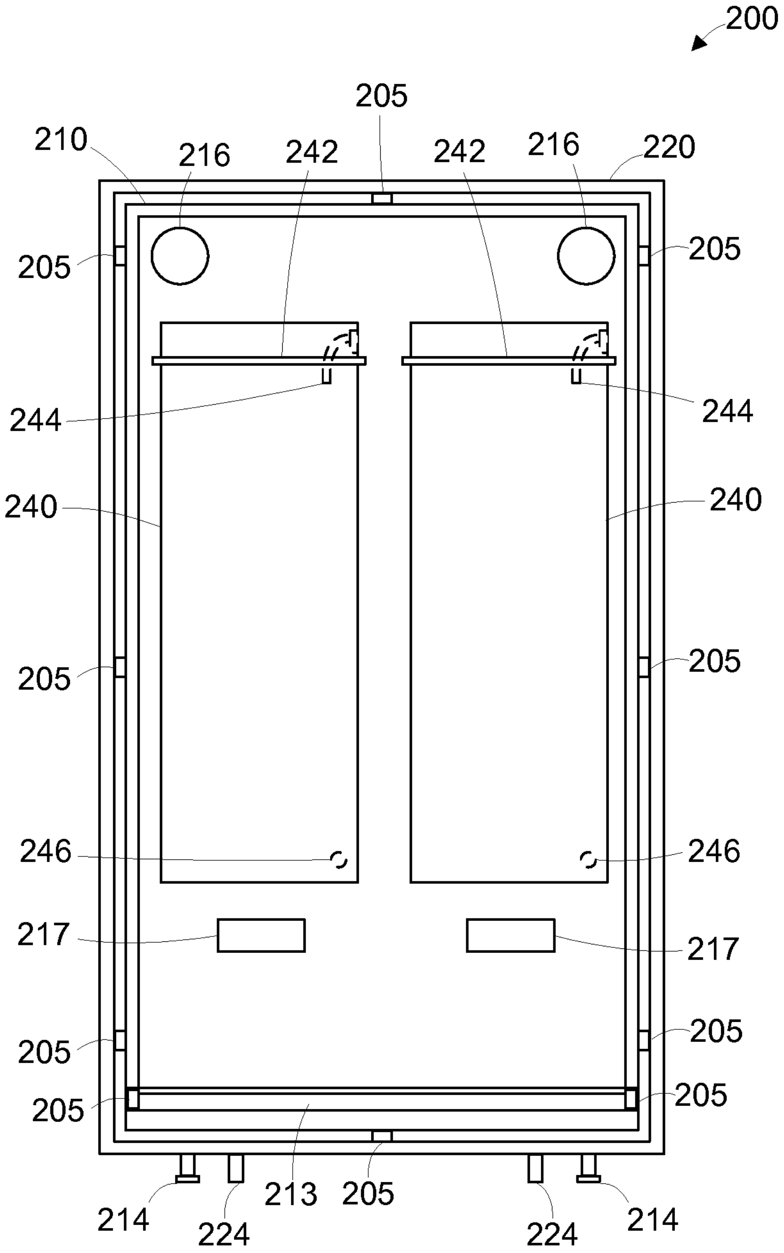
FIG. 7 is rear view of the grow cabinet of FIG. 6.
Figure 8:
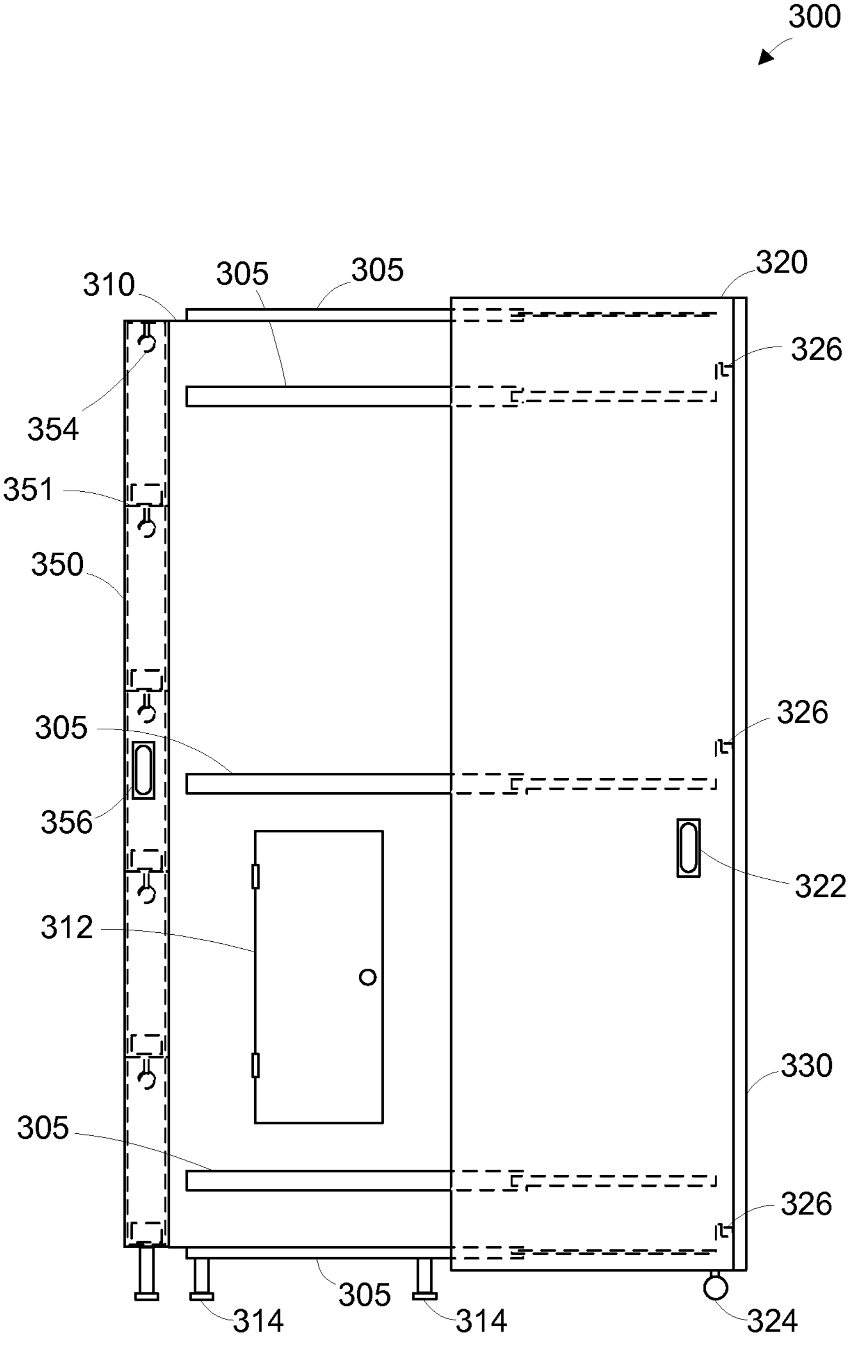
FIG. 8 is a side view of a third embodiment of a grow cabinet of the present invention, showing a propagator.
Figure 9:
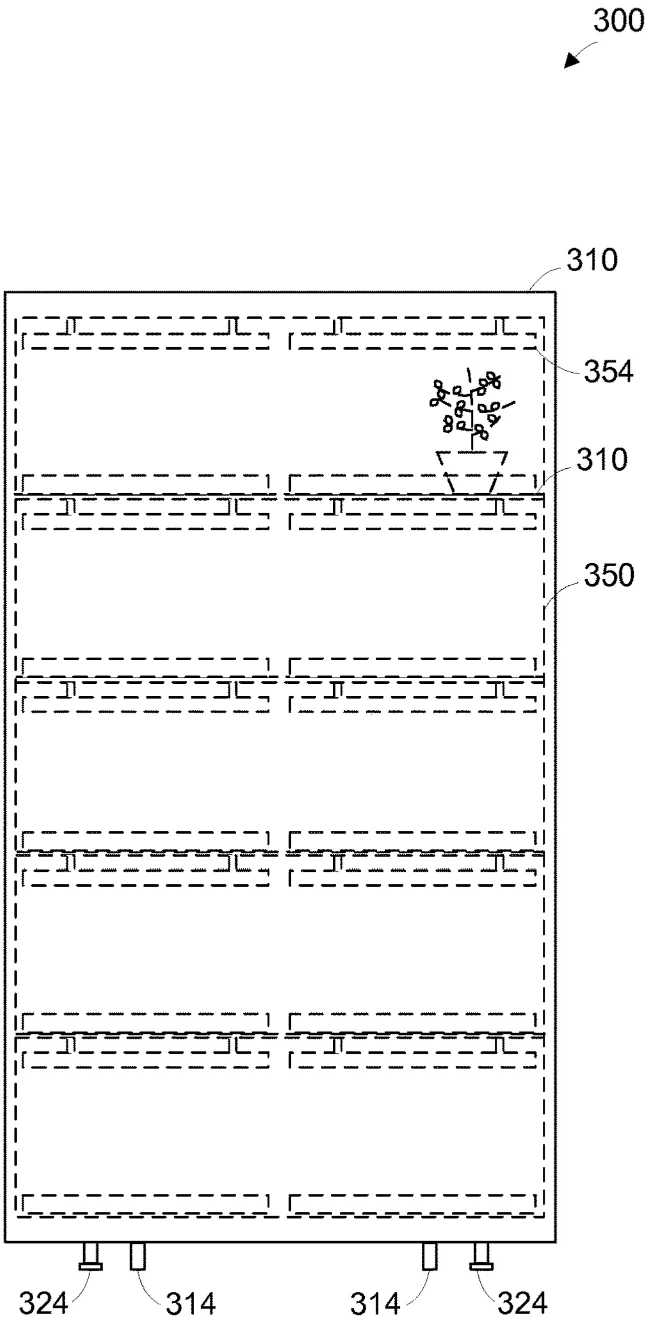
FIG. 9 is a rear view of the grow cabinet of FIG. 8.

Embodiments of the invention will now be described, by way of example, and with reference to the drawings in which:

FIG. 1 is a side view of a first embodiment of a grow cabinet of the present invention;

FIG. 2 is a rear view of the grow cabinet of FIG. 1;

FIG. 3 is a top view of the grow cabinet of FIG. 1;

FIG. 4 is a perspective view of a corner of the grow cabinet of FIG. 1;

FIG. 5 is a front view of the grow cabinet of FIG. 1;

FIG. 6 is a side view of a second embodiment of a grow cabinet of the present invention, showing a water reservoir;

FIG. 7 is rear view of the grow cabinet of FIG. 6;

FIG. 8 is a side view of a third embodiment of a grow cabinet of the present invention, showing a propagator; and FIG. 9 is a rear view of the grow cabinet of FIG. 8.

A first embodiment of the present invention will now be described with reference to FIGS. 1 to 5. A grow cabinet 100 is provided, which includes a first portion 110 and a second portion 120. In this embodiment, the first portion 110 is substantially cuboidal, wherein one face of the cuboid is omitted to define a first cavity. The second portion 120 is also substantially cuboidal, wherein two faces of the cuboid are omitted. The second portion 120 also includes a door 130, which replaces one of the omitted faces of the cuboid of the second portion 120. The second portion 120 and the door 130 therefore define a second cavity.

As shown in FIG. 1, the first portion 110 is dimensioned to fit within the second portion 120, that is, the height and width of the first portion 110 are less than the internal height and width of the second portion 120. In this context, the height is taken to be in a direction normal to the ground and width is taken to be parallel to the ground (into the page of FIG. 1).

As shown more specifically in FIG. 2, the first and second portion 110, 120 are dimensioned such that the first portion 110 may register with the second portion 120. In other words, the first portion 110 may fit within the second portion 120, such that an outer surface of the first portion 110 may slidably engage the inner surface of the second portion 120.

To facilitate this slidable engagement, runners 105 are provided at the interface of the first and second portion 110, 120. In this embodiment, eight runners 105 are provided, six between the interfaces of the longer faces of the first and second portions 110, 120, and two between the interfaces of the shorter faces of the first and second portions 110, 120. The skilled person will appreciate that the first and second portions 110, 120 are therefore dimensioned such that the runners 105 may be sandwiched between the first and second portions 110, 120. In this embodiment, the runners are stainless-steel ball-bearing runners, which are particularly advantageous as they may detach without removing any screws. Thus, the first and second portion 110, 120 may be separated without using any equipment.

The skilled reader will appreciate that the open face of the second portion 120 faces the open face of the first portion 110. Therefore, the first cavity combines with the second cavity, such that they are in communication with each other, creating a combined cavity. The combined cavity forms the internal environment of the grow cabinet 100. The skilled reader will understand that the floor area (and therefore the volume) of the combined cavity is variable by virtue of the slidable engagement of the first and second portions 110, 120.

The first portion 110 includes feet 114 to engage the ground. The feet 114 are adjustable in order to level the grow cabinet 100 on uneven ground. In this embodiment, the height of the feet 114 may be adjusted from inside the grow cabinet 100. The second portion 120 includes wheels 124, to engage the ground in a manner that produces little friction as the second portion 120 is moved relative to the first portion 110. A bottom face of the second portion 120, that is the face including the wheel 124, also includes a slit for the feet 114 of the first portion 110 to pass through. The bottom face and slit are described in more detail below.

In this embodiment, the first portion 110 further includes a small door 112 and the second portion 120 further includes a side handle 122.

With reference to FIG. 2, the first portion 110 includes an air vent 116 on a rear face. The air vent 116 allows the horticulturalist to control the air of the internal environment of the grow cabinet 100. For example, the horticulturalist may put either an inlet or outlet fan (not shown) in the air vent 116 to ensure fresh air passes through the grow cabinet, he may also introduce Carbon Dioxide through the air vent 116 to increase the concentration of Carbon Dioxide in the internal environment. In this embodiment, the first portion 110 further includes grills 117 on the rear face of the first portion 110.

FIG. 2 also illustrates a shelf 113, atop the bottom face of the first portion 110. The shelf 113 engages the first portion 110 via runners 105, such that the shelf 113 may be moved parallel to a bottom face of the first portion 110. Therefore, a plant sat on the shelf 113 may be moved, for example, to a central area of the combined cavity.

FIG. 3 is a top view of the grow cabinet 100 of the first embodiment, illustrating the first portion 110 and second portion 120, slidably engaged via runners 105, and the second portion 120 including a door 130.

FIG. 4 is a perspective view of a corner of the grow cabinet 100, with the door 130 open. The door 130 is hingedly attached to a side face of the second portion 120. In this embodiment, the door 130 is attached via a concealed hinge 126 to a cutaway section of the second portion 120. FIG. 4 also illustrates the first portion 110 being slidably engaged to the second portion via runners 105.

In order to further control the internal environment of the grow cabinet 100, that is, the combined first and second cavity, a seal is provided between the first portion 110 and second portion 120. In this embodiment, a first brush seal 118 is attached to the first portion 110, including bristles which bridge a gap defined between the first and second portion 110, 120. The first brush seal 118 is preferable as it substantially prevents air from passing through the gap between the first and second portion 110, 120, in a manner that produces little friction as the second portion 120 is moved relative to the first portion 110.

The second portion 120 also includes a second brush seal 128, which extends across the slit on the bottom face of the second portion 120. The second brush seal 128 therefore substantially prevents air from passing through the slit, in a manner that produces little friction as the second portion 120 is moved relative to the first portion 110.

FIG. 5 illustrates the door 130 of the grow cabinet 100. More specifically, the door 130 includes two bi-folding door sections 130*a*, 130*b*. The bi-folding door sections 130*a*, 130*b* allow the horticulturalist to gain access to the combined cavity advantageously, by only opening one portion to minimize disturbances to the internal environment, or alternatively to fully open the door without substantially increasing the depth of the grow cabinet 100.

FIG. 5 also illustrates a plurality of windows 135 provided on the door 130. Each window 135 includes a flap 135*m*. with complimentary dimensions to the window 135, attached to one of the bi-folding door portions 130*a*, 130*b* via a hinge 135*b*, and a flap-latch 135*c*. The window 135 allows the horticulturalist to view inside the grow cabinet 100 without disturbing the internal environment. The windows 135 are UV protective, such as by including a UV absorbing film. The door 130 also includes grills 137.

A second embodiment of a grow cabinet 200 of the present invention will now be described with reference to FIGS. 6 to 7. The grow cabinet 200 of the second embodiment is similar to the first, but further includes water reservoirs 240.

In this embodiment, two water reservoirs 240 are provided on a rear face of a first portion 210 of the grow cabinet 200. The water reservoirs 240 include a retaining pole 242, for securely retaining the water reservoir 240 on the rear face of the first portion 210, a nutrient inlet 244, and a tap 246. The horticulturalist may therefore insert his/her desired nutrients into the water reservoir 240 via the nutrient inlet 244, and remove the nutritious water from the water reservoir 240 through the tap 246. The tap 246 is provided inside the combined cavity.

A third embodiment of a grow cabinet 300 of the present invention will now be described with reference to FIGS. 8 and 9. The grow cabinet 300 of the third embodiment is similar to the first but further includes a propagator 350.

The propagator 350 is provided on a rear face of a first portion 310 of the grow cabinet 300. As shown in FIGS. 8 and 9, the propagator includes a plurality of shelves 351. The horticulturalist may therefore position lights 354 above the shelves 351, and place a plant tray on the shelf 351. Therefore, the horticulturalist may grow young plants in the propagator 350 before transferring them to the combined cavity of the grow cabinet 300 at maturity.

The skilled person will understand that the grow cabinet of the present invention is not limited to two portions. The grow cabinet may be provided in a plurality of portions, wherein two outer portions (configured to define a cavity) surround one or more inner portions (configured to define a complimentary channel). Thus, the grow cabinet is a modular assembly which may provide a grow cabinet with any number of slidably engaged portions, for varying the floor area (and therefore volume) of a combined cavity.

Furthermore, additional features, such as a lock for the door, or a motor for assisting the relative motion of the first and second portions, may be implemented.

The skilled person will also understand that the grow cabinet of the present invention is not limited to any of the non-essential features of any one of the embodiments described above. For example, the material choice, use of an inner thermal insulator layer and reflective material, shape, runner, feet and wheel, small door, side handle, air vent, grills, shelf, seals, door, water reservoir and propagator are all non-essential features.

In the above embodiments, the first and second portions of the grow cabinet are constructed out of plywood coated in fire retardant sealant and include an inner thermal insulator layer (not shown), wrapped in a reflective material (not shown). The edges of the first and second portion are covered in galvanised steel (not shown) to protect the reflective material. To further improve the thermal qualities of the grow cabinet, a channel (not shown) is provided through the plywood second portion, sealed off at either end by a rubber stip (not shown). The skilled reader will understand that these are non-essential features.

Whilst the provision of a seal is a non-essential feature, the choice of a brush seal is particularly preferable for the reasons outlined above. Alternatively, other forms of seal may be used. Furthermore, the choice of a bi-folding door is particularly preferable for the reasons outline above, although other forms of door may be used.

The skilled person will understand that any combination of features is possible without departing from the spirit or scope of the present invention, as claimed.

The invention claimed is:

1. A grow cabinet, for indoor use, comprising:

a first portion having an outside, defining a first cavity, wherein a bottom face of the first portion includes at least one ground-engaging foot projecting from the bottom face, wherein the first portion has a first floor; and a second portion, defining a second cavity, wherein a bottom face of the second portion includes at least one ground-engaging wheel and a slit, wherein the slit is configured to register with the at least one foot of the first portion and wherein the second portion has a second floor and a door, wherein the first portion and second portion are configured to register, for communication of the first and second cavities and for complimentary slidable engagement, such that a floor area of the combined first cavity and second cavity is variable, wherein the second portion passes around the outside of the first portion, and wherein the at least one foot extends from the bottom face of the first portion towards the bottom face of the second portion, into and through said slit, and extends out of the slit so that the at least one foot projects out and away from the bottom face of the second portion to support the first portion on a floor on which the first portion is placed in use, such that a portion of said at least one ground-engaging foot within the slit passes along the slit as the second portion moves on the at least one ground-engaging wheel relative to the first portion, so that the second portion is moveable relative to the first portion, wherein the second floor is below the first floor before, during, and after complimentary slidable engagement; and wherein the combined first cavity and second cavity form an enclosed space to provide a controllable environment with respect to temperature and humidity suitable for growing a plant, in which the volume of the enclosed space can be adjusted by moving the second portion, the enclosed space being accessible from outside via the door.

2. The grow cabinet of claim 1, further comprising a runner, for complimentary slidable engagement of the first portion and second portion.

3. The grow cabinet of claim 1, further comprising a seal, for sealing the combined cavities.

4. The grow cabinet of claim 1, wherein the slit further includes a seal, for sealing the combined cavities.

5. The grow cabinet of claim 1, wherein the first portion and/or second portion includes an air vent.

6. The grow cabinet of claim 1, wherein the first portion and/or second portion includes a window.

7. The grow cabinet of claim 1, wherein an inner surface of the first portion and/or an inner surface of the second portion include a reflective coating.

8. The grow cabinet of claim 1, wherein the door is a bifolding door.

9. The grow cabinet of claim 1, further comprising a water reservoir.

10. The grow cabinet of claim 9, wherein the water reservoir is provided on a rear face of the first portion.

11. The grow cabinet of claim 1, further comprising a propagator.

12. The grow cabinet of claim 11, wherein the propagator is provided on a rear face of the first portion.

13. A method of using a grow cabinet, for indoor use, comprising:

providing a first portion having an outside, defining a first cavity, wherein a bottom face of the first portion includes at least one ground-engaging foot projecting from the bottom face, wherein the first portion has a first floor; and providing a second portion, defining a second cavity, wherein a bottom face of the second portion includes at least one ground-engaging wheel and a slit, wherein the slit is configured to register with the at least one foot of the first portion and wherein the second portion has a second floor and a door, wherein the first portion and second portion are configured to register, for communication of the first and second cavity and for complimentary slidable engagement, such that a floor area of the combined first cavity and second cavity is variable, passing the second portion around the outside of the first portion, and wherein the at least one foot extends from the bottom face of the first portion towards the bottom face of the second portion, into and through said slit, and extends out of the slit so that the at least one foot projects out and away from the bottom face of the second portion, supporting the first portion on a floor, such that a portion of said at least one ground-engaging adjustable foot within the slit passes along the slit as the second portion moves on the at least one ground-engaging wheel relative to the first portion, so that the second portion is moveable relative to the first portion wherein the second floor is below the first floor before, during, and after complimentary slidable engagement; and wherein the combined first cavity and second cavity form an enclosed space to provide a controllable environment with respect to temperature and humidity suitable for growing a plant, in which the volume of the enclosed space can be adjusted by moving the second portion, and accessing the enclosed space from outside via the door.

* * * * *